(12) United States Patent
Ping

(10) Patent No.: US 11,726,944 B2
(45) Date of Patent: Aug. 15, 2023

(54) TRANSACTION LAYER CIRCUIT OF PCIE AND OPERATION METHOD THEREOF

(71) Applicants: Faraday Technology Corporation, Suzhou (CN); Faraday Technology Corp., Hsinchu (TW)

(72) Inventor: Bu-Qing Ping, Suzhou (CN)

(73) Assignees: Faraday Technology Corporation, Suzhou (CN); Faraday Technology Corp., Hsinchu (TW)

( * ) Notice: Subject to any disclaimer, the term of this patent is extended or adjusted under 35 U.S.C. 154(b) by 0 days.

(21) Appl. No.: 17/542,531

(22) Filed: Dec. 6, 2021

(65) Prior Publication Data

US 2023/0029065 A1 Jan. 26, 2023

(30) Foreign Application Priority Data

Jul. 22, 2021 (CN) .......................... 202110830494.6

(51) Int. Cl.
*G06F 13/34* (2006.01)
*G06F 13/42* (2006.01)
*H04L 69/324* (2022.01)

(52) U.S. Cl.
CPC ........ *G06F 13/4221* (2013.01); *H04L 69/324* (2013.01); *G06F 2213/0026* (2013.01)

(58) Field of Classification Search
CPC ......... G06F 13/4221; G06F 2213/0026; H04L 69/324
See application file for complete search history.

(56) References Cited

U.S. PATENT DOCUMENTS 6,493,356 B1 * 12/2002 Aramizu ................. H04L 49/30
370/474
10,176,126 B1 * 1/2019 Banerjee ............. G06F 13/4221
2007/0260782 A1 11/2007 Shaikli
(Continued)

FOREIGN PATENT DOCUMENTS

| CN | 111124971 | 5/2020 |
| TW | 201218708 | 5/2012 |

OTHER PUBLICATIONS

"Notice of allowance of Taiwan Counterpart Application", dated Mar. 17, 2022, p. 1-p. 5.

*Primary Examiner* — Henry Tsai
*Assistant Examiner* — Kim T Huynh
(74) *Attorney, Agent, or Firm* — JCIPRNET

(57) ABSTRACT

The invention provides a transaction layer circuit of a PCIe. The transaction layer circuit includes transaction layer processing channels, a channel selection circuit, and a merge circuit. The transaction layer processing channels are coupled to a data bus transmitting at least one packet data output by a data link layer circuit of the PCIe. The channel selection circuit receives packet start/end location information in a current clock cycle from the data link layer circuit, and distributes at least one packet data in the current clock cycle to at least one transaction layer processing channel according to the packet start/end location information. The merge circuit is coupled to the transaction layer processing channels and selectively merges transaction layer processing results output by the transaction layer processing channels based on the distribution of the packet data in the current clock cycle to the transaction layer processing channels via the channel selection circuit.

9 Claims, 8 Drawing Sheets

(56) References Cited

U.S. PATENT DOCUMENTS

| | | | |
|---|---|---|---|
| 2007/0268931 A1* | 11/2007 | Shaikli | H04L 47/50 |
| | | | 370/468 |
| 2013/0067138 A1* | 3/2013 | Schuette | G06F 3/0629 |
| | | | 711/E12.008 |
| 2013/0195210 A1 | 8/2013 | Swarbrick et al. | |
| 2016/0210313 A1* | 7/2016 | Chen | G06F 16/21 |
| 2017/0272231 A1* | 9/2017 | Chen | H04L 25/14 |
| 2020/0145341 A1 | 5/2020 | Das Sharma | |
| 2020/0327088 A1* | 10/2020 | Choudhary | G06F 1/10 |

\* cited by examiner

Table 310:

| Unit0 | Unit1 | Unit2 | Unit3 | Unit4 | Unit5 | Unit6 | Unit7 | Unit8 | Unit9 | Unit10 | Unit11 | Unit12 | Unit13 | Unit14 | Unit15 |
|---|---|---|---|---|---|---|---|---|---|---|---|---|---|---|---|
| ST | HEAD0 | HEAD1 | HEAD2 | LCRC | ST | HEAD0 | HEAD1 | HEAD2 | DATA0 | LCRC | ST | HEAD0 | HEAD1 | HEAD2 | DATA0 |
| DATA1 | LCRC | ST | HEAD0 | HEAD1 | HEAD2 | LCRC | ST | HEAD0 | HEAD1 | HEAD2 | LCRC | ST | HEAD0 | HEAD1 | HEAD2 |
| LCRC | ST | HEAD0 | HEAD1 | HEAD2 | DATA0 | DATA1 | DATA2 | LCRC | ST | HEAD0 | HEAD1 | HEAD2 | LCRC | ST | HEAD0 |
| HEAD1 | HEAD2 | DATA0 | LCRC | ST | HEAD0 | HEAD1 | HEAD2 | DATA0 | DATA1 | LCRC | ST | HEAD0 | HEAD1 | HEAD2 | LCRC |

Table 320:

| Unit0 | Unit1 | Unit2 | Unit3 | Unit4 | Unit5 | Unit6 | Unit7 | Unit8 | Unit9 | Unit10 | Unit11 | Unit12 | Unit13 | Unit14 | Unit15 |
|---|---|---|---|---|---|---|---|---|---|---|---|---|---|---|---|
|  | HEAD0 | HEAD1 | HEAD2 |  |  | HEAD0 | HEAD1 | HEAD2 | DATA0 |  |  | HEAD0 | HEAD1 | HEAD2 | DATA0 |
| DATA1 |  |  | HEAD0 | HEAD1 | HEAD2 |  |  | HEAD0 | HEAD1 | HEAD2 |  |  | HEAD0 | HEAD1 | HEAD2 |
|  |  | HEAD0 |  | HEAD2 | DATA0 | DATA1 | DATA2 |  |  | HEAD0 | HEAD1 | HEAD2 |  |  | HEAD0 |
| HEAD1 | HEAD2 | DATA0 |  |  | HEAD0 | HEAD1 | HEAD2 | DATA0 | DATA1 |  |  | HEAD0 | HEAD1 | HEAD2 |  |

TRANSACTION LAYER CIRCUIT OF PCIE AND OPERATION METHOD THEREOF

CROSS-REFERENCE TO RELATED APPLICATION

This application claims the priority benefit of China application serial no. 202110830494.6, filed on Jul. 22, 2021. The entirety of the above-mentioned patent application is hereby incorporated by reference herein and made a part of this specification.

BACKGROUND OF THE INVENTION

Field of the Invention

The invention relates to a transaction layer circuit of a peripheral component interconnect express (PCIe) and an operation method thereof.

Description of Related Art

Peripheral Component Interconnect Express (PCIe) is capable of performing point-to-point serial linking using one or a plurality of channels, and is configured for interconnection at the motherboard level, expansion card interface, and so on. In a PCIe, a layered structure including a software layer, a transaction layer, a data link layer, and a physical layer is defined to control and manage information transmission. Errors in the data transfer process are mainly detected by cyclic redundancy check (CRC) coding. In particular, the data link layer generates and proofreads link CRC (LCRC), and the transaction layer generates and proofreads end-to-end CRC (ECRC).

The transaction layer is configured to generate a transaction layer packet (TLP), and mainly includes three parts: header, payload (in the case of a write request), and ECRC. The header content includes the sender's relevant information, target address, transaction type (such as memory read, memory write), data size sent, requester ID or completer ID, and so on. For example, the transaction layer at the receiving side checks the ECRC error in the TLP received from the data link layer. In the absence of errors or any other defects, the transaction layer sends the information and payload included in the header to the software layer. The transaction layer at the sending side checks the tag of the request TLP during the request sending period and the tag of the completion TLP during the response reception period to check whether the expected response is received (completion check). In some cases, if there is no switch in the user's design, such as in the case of only a simple end-to-end direct connection (such as root and endpoint), then ECRC may be omitted.

When a plurality of TLPs occur in the same clock cycle, how to process the plurality of TLPs at the same time is one of the major technical issues in the art.

SUMMARY OF THE INVENTION

The invention provides a transaction layer circuit of a peripheral component interconnect express (PCIe), wherein a plurality of transaction layer packets (TLPs) may be processed simultaneously in the same clock cycle.

According to an embodiment of the invention, a transaction layer circuit of a PCIe includes a plurality of transaction layer processing channels, a channel selection circuit, and a merge circuit. The plurality of transaction layer processing channels are coupled to a data bus, and the data bus is configured to transmit at least one packet data output by a data link layer circuit of the PCIe. The channel selection circuit is configured to receive a packet start location information and a packet end location information in a current clock cycle from the data link layer circuit and distribute the at least one packet data in the current clock cycle to at least one of the plurality of transaction layer processing channels according to the packet start location information and the packet end location information. The merge circuit is coupled to the plurality of transaction layer processing channels. The merge circuit selectively merges transaction layer processing results output by the plurality of transaction layer processing channels based on the distribution of the at least one packet data in the current clock cycle to the plurality of transaction layer processing channels via the channel selection circuit.

According to another embodiment of the invention, an operation method of a transaction layer circuit of a PCIe includes: coupling a plurality of transaction layer processing channels to a data bus, wherein the data bus is configured to transmit at least one packet data output by a data link layer circuit of the PCIe; receiving a packet start location information and a packet end location information in a current clock cycle from the data link layer circuit via a channel selection circuit; distributing the at least one packet data in the current clock cycle to at least one of the plurality of transaction layer processing channels via the channel selection circuit according to the packet start location information and the packet end location information; and merging transaction layer processing results output by the plurality of transaction layer processing channels selectively via a merge circuit based on the distribution of the at least one packet data in the current clock cycle to the plurality of transaction layer processing channels via the channel selection circuit.

In the transaction layer circuit of the PCIe according to an embodiment of the invention, each of the one or plurality of packet data in the current clock cycle may be distributed to one of the plurality of transaction layer processing channels for transaction layer processing via the channel selection circuit, and the transaction layer processing results output by the plurality of transaction layer processing channels may be selectively merged via the merge circuit. Therefore, the transaction layer circuit may simultaneously process a plurality of TLPs in the same clock cycle.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A is a schematic diagram of a data transmission arrangement according to an embodiment of the invention.

FIG. 3B is a schematic diagram of marking processing of data transmission according to an embodiment of the invention.

DESCRIPTION OF THE EMBODIMENTS

Figure 1:
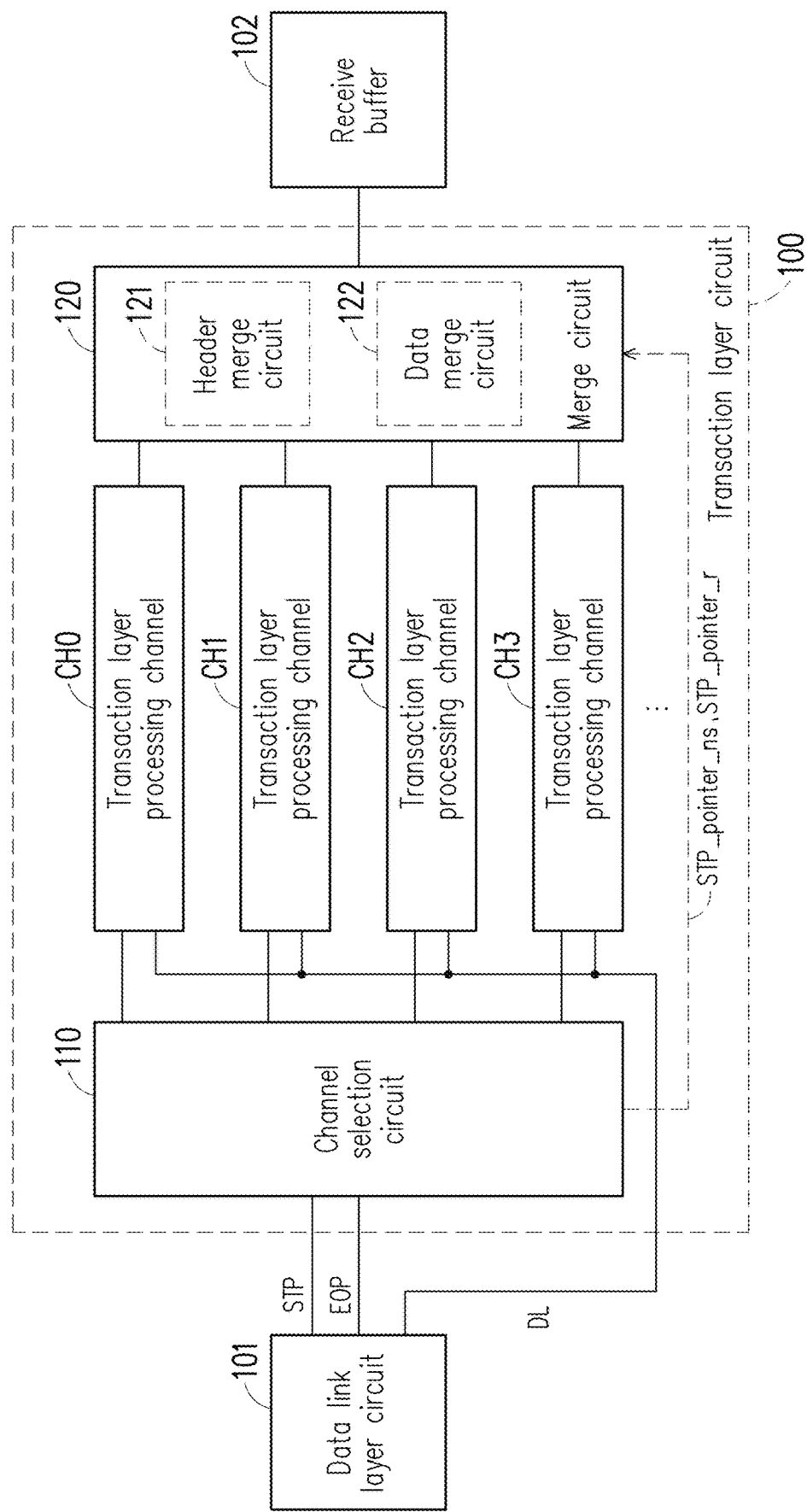
FIG. 1 is a schematic diagram of a circuit block of a transaction layer circuit of a peripheral component interconnect express (PCIe) according to an embodiment of the invention.

Hereinafter, reference will be made in detail to exemplary embodiments of the invention, and examples of the exemplary embodiments are illustrated in the figures. Wherever possible, the same reference numerals are used in the figures and the descriptions to refer to the same or similar portions. In FIG. 1 and similar figures following FIG. 1, the boundary between one circuit or functional block and another circuit or functional block respectively indicated by blocks basically indicates a functional boundary, and does not necessarily correspond to the separation of physical locations, separation of electrical signals, separation of control logic, and the like. Each circuit or functional block may be a hardware module physically separated from another block to some extent, or may indicate a function of a hardware module physically integrated with another block.

FIG. 1 is a circuit block diagram of a transaction layer circuit 100 of a Peripheral Component Interconnect Express (PCIe) according to an embodiment of the invention. The transaction layer circuit 100 may be interconnected with a data link layer circuit 101 of the PCIe via a data bus DL. The data bus DL may transmit at least one packet data output by the data link layer circuit 101. In the embodiment shown in FIG. 1, the transaction layer circuit 100 includes a channel selection circuit 110, transaction layer processing channels CH0 to CH3, and a merge circuit 120, wherein the number of the transaction layer processing channels CH0 to CH3 is just an example, and the present embodiment is not limited in this regard.

Figure 2:
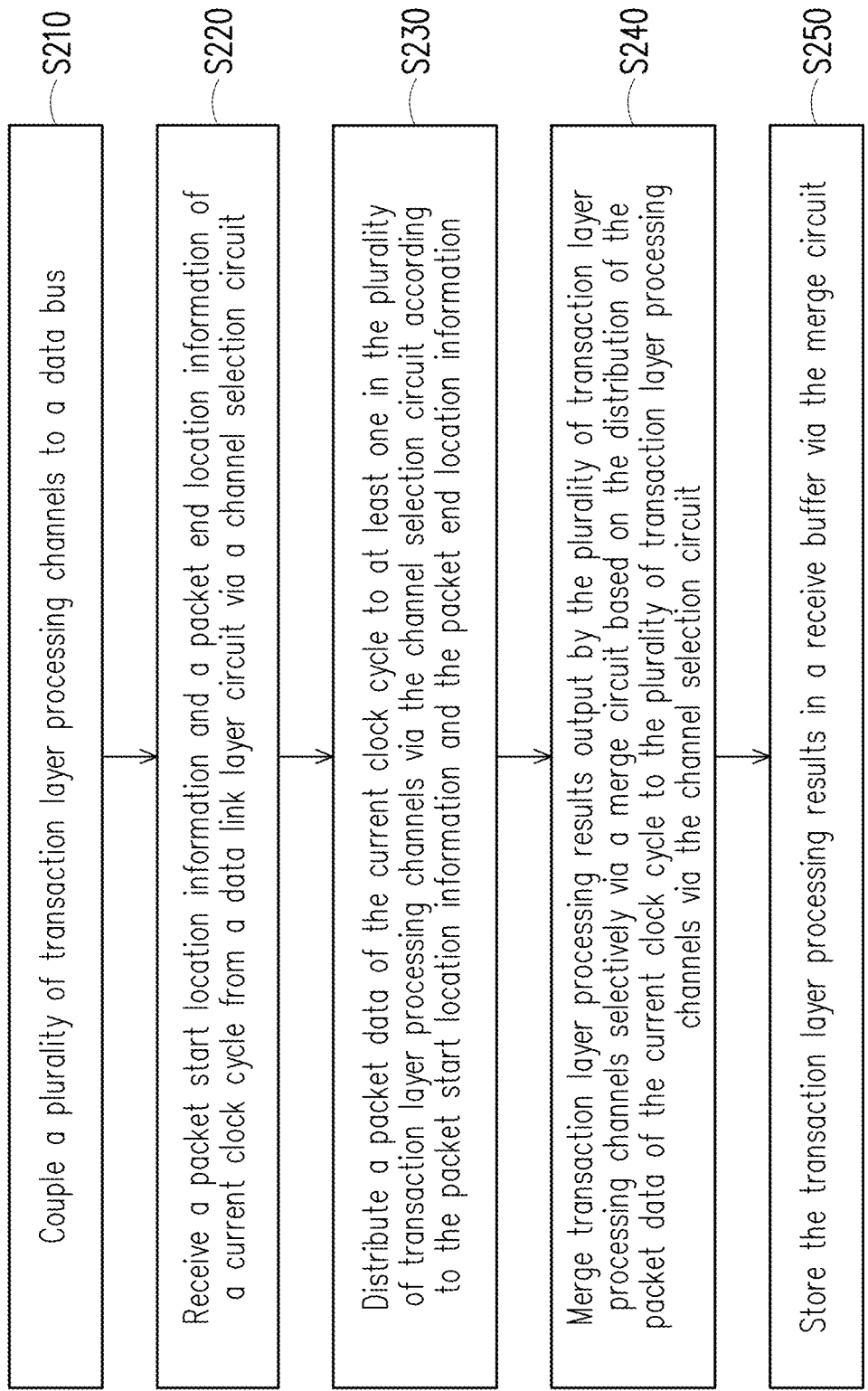
FIG. 2 is a schematic flowchart of an operation method of a transaction layer circuit of a PCIe according to an embodiment of the invention.

FIG. 2 is a schematic flowchart of an operation method of the transaction layer circuit 100 of the PCIe according to an embodiment of the invention. Please refer to FIG. 1 and FIG. 2. In step S210, the transaction layer processing channels CH0 to CH3 are coupled to the data bus DL. The transaction layer processing channels CH0 to CH3 may be coupled to the data bus DL to receive packet data. The merge circuit 120 may be coupled to the transaction layer processing channels CH0 to CH3 and the receive buffer 102 to maintain the order of data transmission. In some embodiments, the merge circuit 120 may include a header merge circuit 121 and a data merge circuit 122 to receive transaction layer processing results output by the transaction layer processing channels CH0 to CH3 for selective merging, and store the transaction layer processing results in the receive buffer 102. In particular, the receive buffer 102 may be built-in or externally connected to the transaction layer circuit 100, and the present embodiment is not limited in this regard.

In step S220, the channel selection circuit 110 may receive a packet start location information STP and a packet end location information EOP in the current clock cycle from the data link layer circuit 101. In some embodiments, the channel selection circuit 110 may count the number of the valid packet start location indicated by the packet start location information STP and the number of the valid packet end location indicated by the packet end location information EOP in the current clock cycle according to the packet start location information STP and the packet end location information EOP in the current clock cycle. In some embodiments, the channel selection circuit 110 may distribute at least one packet data in the current clock cycle to at least one of the transaction layer processing channels CH0 to CH3 according to the packet start location information STP and the packet end location information EOP.

For example, FIG. 3A is a schematic diagram illustrating the arrangement of packet data transmission of the data link layer circuit 101 according to an embodiment of the invention. The vertical axis shown in FIG. 3A indicates time, that is, each row indicates one clock cycle. The horizontal axis shown in FIG. 3A indicates the basic data processing unit of the PCIe specification, that is, each column indicates one double word (DWORD), and one double word has 4 bytes. In the embodiment shown in FIG. 3A, taking 32 bits with a data width of 512 bits and one double word (DWORD) for each data unit bit width as an example, in one clock cycle, 16 double words (unit 0 to unit 15 shown in FIG. 3A) are transmitted between different layers. A packet data stream 310 shown in FIG. 3A indicates a plurality of packet data transmitted by the physical layer to the data link layer circuit 101. In the packet data stream 310, the composition of one packet data includes a packet start ST, headers HEAD0 to HEAD2, a valid payload (may include data DATA0 to DATA2 shown in FIG. 3A), and a check digit LCRC. According to actual transmission, the payload does not necessarily exist in one packet data. The check digit LCRC may be regarded as the packet end of one packet data. After being processed by the data link layer circuit 101, the data link layer circuit 101 removes the packet start ST and the check digit LCRC, as shown in a packet data stream 320. The packet data stream 320 shown in FIG. 3A indicates a plurality of packet data transmitted by the data link layer circuit 101 to the transaction layer circuit 100. The packet data output by the data link layer circuit 101 to the transaction layer 100 may be regarded as one transaction layer packet (TLP).

Figure 3B:
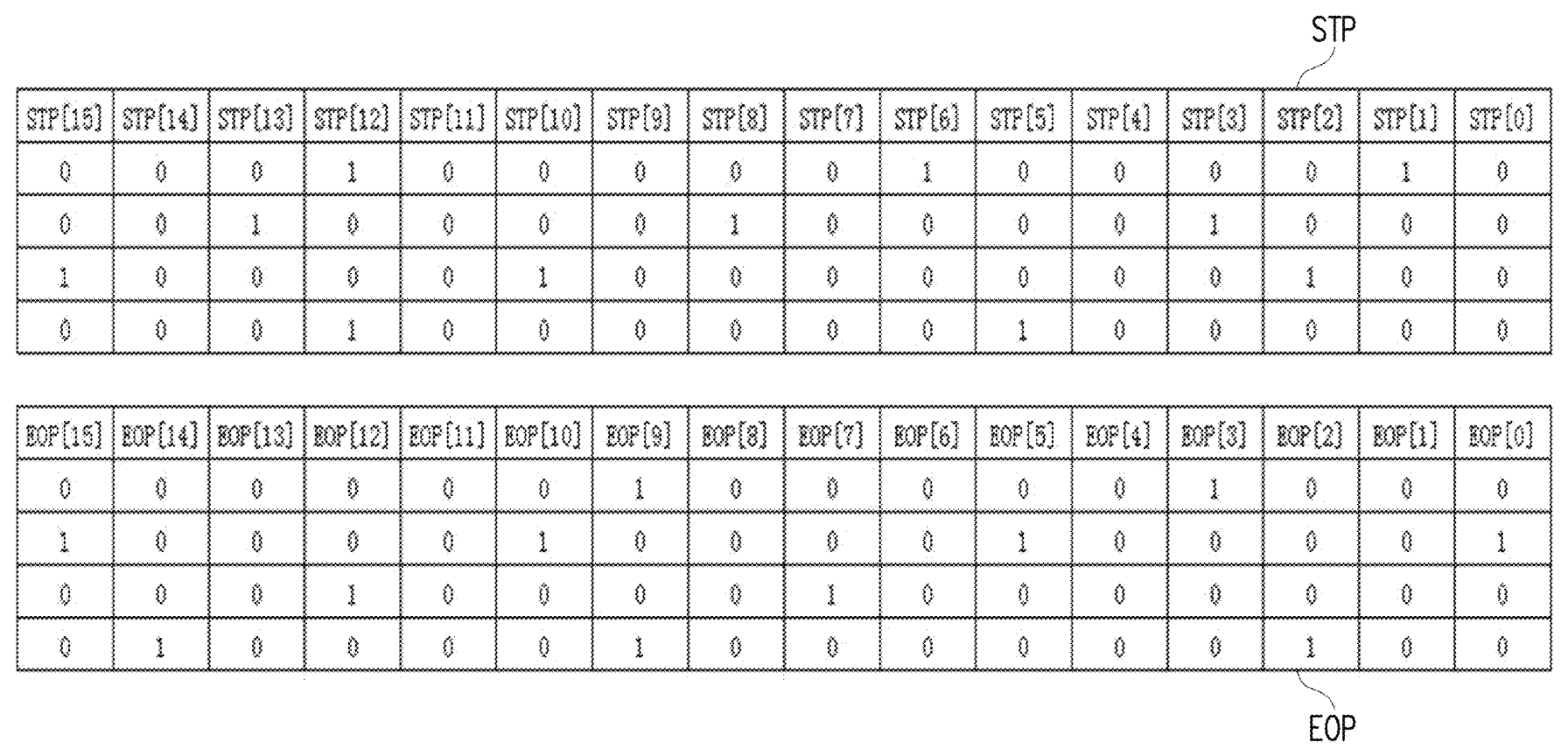

FIG. 3B is a schematic diagram illustrating the arrangement of location information transmission of the data link layer circuit 101 according to an embodiment of the invention. The vertical axis shown in FIG. 3B indicates time, that is, each row indicates one clock cycle. The horizontal axis shown in FIG. 3B indicates different bits of the location information, wherein one bit of the location information corresponds to one double word (DWORD) in the packet data stream 320. For example, the 0th bit STP[0] of the packet start location information STP and the 0th bit EOP[0] of the packet end location information EOP both correspond to unit 0 in the packet data stream 320, and the 15th bit STP[15] of the packet start location information STP and the 15th bit EOP[15] of the packet end location information EOP both correspond to unit 15 in the packet data stream 320. In the embodiment shown in FIG. 3B, the transaction layer processing channels CH0 to CH3 may receive the packet data stream 320 shown in FIG. 3A from the data link layer circuit 101 via the data bus DL, and the channel selection circuit 110 may obtain the packet start location information STP and the packet end location information EOP in the current clock cycle from the data link layer circuit 101. In the embodiment shown in FIG. 3B, any bit of a logic value of 1 in the packet start location information STP indicates the start location of one packet in the current clock cycle of the packet data stream 320. In the same way, it may be deduced that any bit with a logic value of 1 in the packet end location information EOP indicates the end location of one packet in the current clock cycle of the packet data stream 320. In other embodiments, the packet start location information STP and the packet end location information EOP may also be marked with other values, which is not limited in the present embodiment.

Please refer to FIG. 1 and FIG. 2. In step S230, according to the packet start location information STP and the packet end location information EOP, the channel selection circuit 110 may distribute the packet data in the current clock cycle to at least one of the transaction layer processing channels CH0 to CH3 in a round-robin manner or a fixed priority manner. For example, in some embodiments, the channel selection circuit 110 may count the number of bits of the logic value 1 (indicating valid packet start location) of the packet start location information STP and the number of bits of the logic value 1 (indicating valid packet end location) of the packet end location information EOP in the current clock cycle, and set the packet start pointer and the packet end pointer configured to indicate the distribution of the current packet data to the distribution start location and end location of the transaction layer processing channels CH0 to CH3 to distribute the packet data in the current clock cycle to at least one of the transaction layer processing channels CH0 to CH3 according to the packet start pointer and the packet end pointer, then update the packet start pointer according to the number of the valid packet start location, and update the packet end pointer according to the number of the valid packet end location.

Figure 3C:
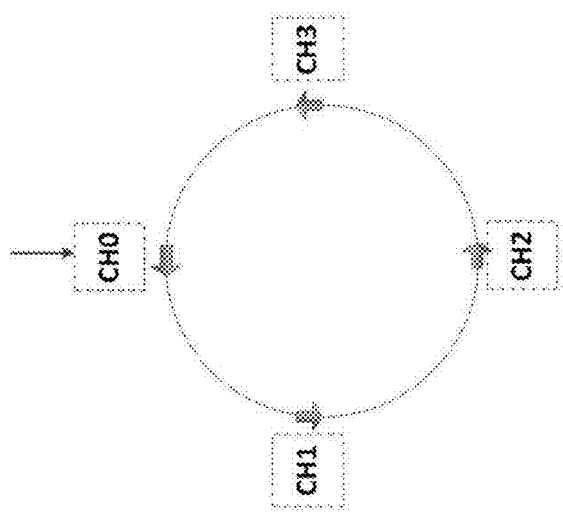
FIG. 3C is a schematic diagram of channel distribution of data transmission according to an embodiment of the invention.

For example, FIG. 3C is a schematic diagram of channel distribution of the transaction layer processing channels CH0 to CH3 according to an embodiment of the invention. Please refer to FIG. 3A to FIG. 3C. In the embodiment shown in FIG. 3C, the channel selection circuit 110 may distribute the packet data stream 320 in the current clock cycle to at least one of the transaction layer processing channels CH0 to CH3 in sequence using the round-robin method as shown in the upper part of FIG. 3C (counter clockwise, with the transaction layer processing channel CH0 as the starting channel). According to the packet start location information STP and the packet end location information EOP shown in FIG. 3B, each packet data of the packet data stream 320 shown in FIG. 3A may be distributed to at least one of the transaction layer processing channels CH0 to CH3, as shown in the lower half of FIG. 3C. The direction of the round robin and the number and arrangement method of the transaction layer processing channels CH0 to CH3 are just an example, and the present embodiment is not limited in this regard. In particular, the round robin according to the packet start location information STP and the packet end location information EOP and the implementation of the selection and distribution of the transaction layer processing channels CH0 to CH3 will be described in more detail in subsequent embodiments.

For another example, the channel selection circuit 110 does not have to use the round-robin method shown in the upper part of FIG. 3C. For example, the channel selection circuit 110 may distribute each packet data of the packet data stream in the current clock cycle to at least one of the transaction layer processing channels CH0 to CH3 using a fixed priority method. For example, in some embodiments, the priority order of the transaction layer processing channels CH0 to CH3 may be preset (for example, the priority from high to low is the transaction layer processing channels CH0, CH1, CH2, and CH3, respectively). Each time each packet data in the packet data stream (for example, the packet data stream 320) is received, the packet data is always distributed to the free (currently unprocessed packet data) transaction layer processing channels CH0 to CH3 according to the order of priority. For example, when distributing packet data, the channel selection circuit 110 always first checks whether the transaction layer processing channel with the highest priority (for example, the transaction layer processing channel CH0) is free. If it is determined that the transaction layer processing channel CH0 is free, then the channel selection circuit 110 may distribute the packet data to the highest priority transaction layer processing channel CH0. When the highest priority transaction layer processing channel CH0 is busy (processing other packet data), the channel selection circuit 110 continues to check whether the second priority transaction layer processing channel (for example, the transaction layer processing channel CH1) is free, and so on. For another example, when the last packet data in the previously received packet data stream is incomplete data (unfinished TLP) and is distributed to one of the transaction layer processing channels (for example, the transaction layer processing channel CH2), then the first incomplete data in the currently received packet data stream (continuing the previous last packet data) may be distributed to the transaction layer processing channel (the transaction layer processing channel CH2), and the next packet data continues to use the fixed priority method to start the checking and distributing actions from the transaction layer processing channel (the transaction layer processing channel CH0) with the highest priority.

In step S240 shown in FIG. 2, based on the distribution of the packet data in the current clock cycle to the transaction layer processing channels CH0 to CH3 via the channel selection circuit 110, the merge circuit 120 may selectively merge transaction layer processing results output by the transaction layer processing channels CH0 to CH3. In step S250, the merge circuit 120 may store the transaction layer processing results of the transaction layer processing channels CH0 to CH3 in the receive buffer 102.

Figure 4:
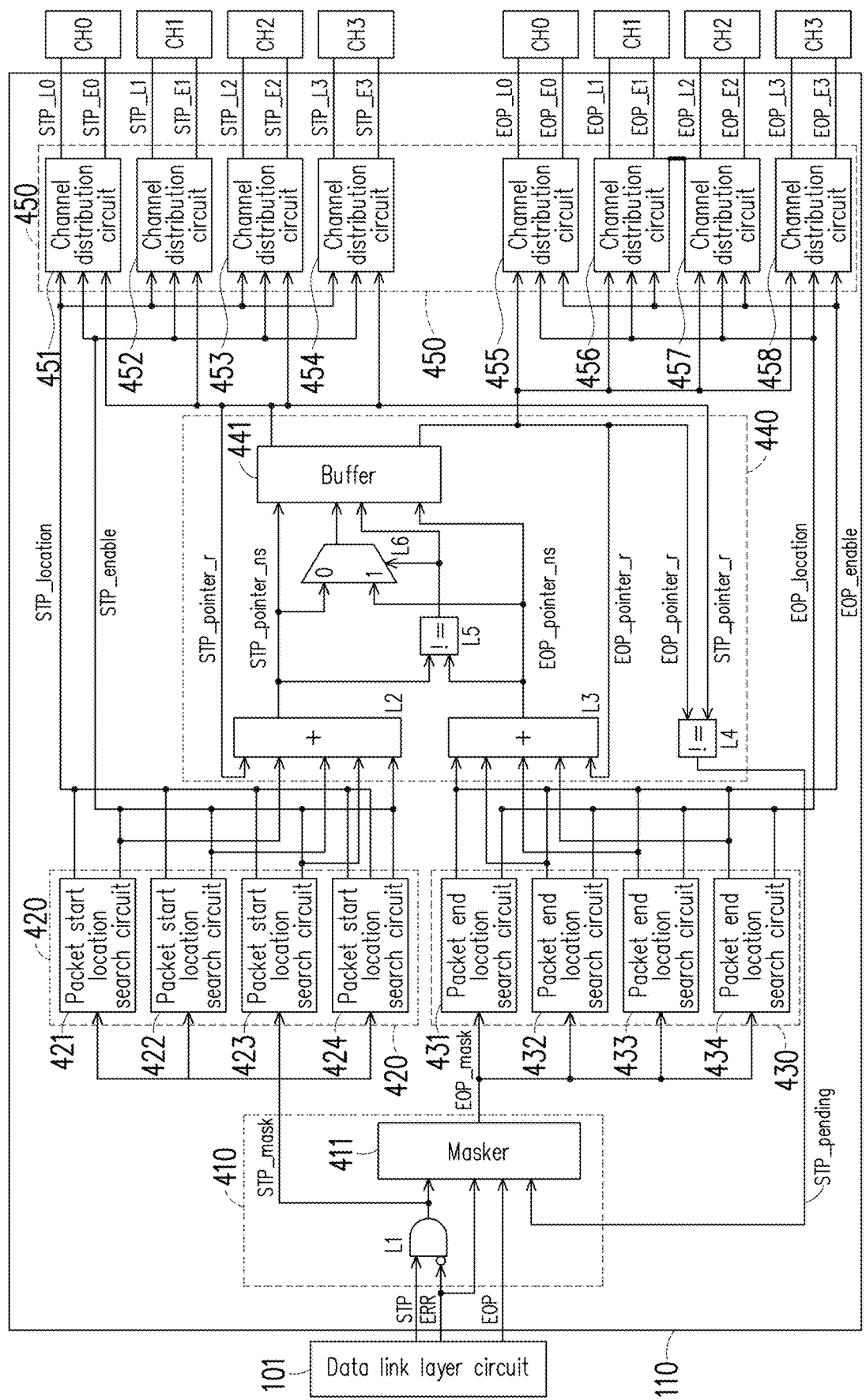
FIG. 4 is a schematic circuit block diagram illustrating the channel selection circuit shown in FIG. 1 according to an embodiment of the invention.

FIG. 4 is a circuit block diagram illustrating the channel selection circuit 110 shown in FIG. 1 according to an embodiment of the invention. The channel selection circuit 110 may receive the packet start location information STP and the packet end location information EOP in the current clock cycle from the data link layer circuit 101. In the embodiment shown in FIG. 4, the channel selection circuit 110 may also receive an error data location information ERR in the current clock cycle from the data link layer circuit 101. In particular, the implementation method of the error data location information ERR may be deduced by referring to the setting method of the packet start location information STP or the packet end location information EOP. The error data location information ERR may indicate the location of invalid data in the current clock cycle of the packet data stream 320.

In the embodiment shown in FIG. 4, the channel selection circuit 110 includes an error correction circuit 410, a packet start location search circuit 420, a packet end location search circuit 430, a round-robin circuit 440, and a channel distribution circuit 450. The error correction circuit 410 may receive the packet start location information STP, the error data location information ERR, and the packet end location information EOP in the current clock cycle, and mask the invalid packet start location in the packet start location information STP according to the error data location information ERR to generate an error-corrected packet start location information STP_mask, and mask the invalid packet end location in the packet end location information EOP according to the error data location information ERR to generate an error-corrected packet end location information EOP mask.

In the embodiment shown in FIG. 4, the error correction circuit 410 may include an AND gate L1 and a masker 411. In particular, the non-inverting input terminal and the inverting input terminal of the AND gate L1 may respectively receive the packet start location information STP and the error data location information ERR. The output terminal of the AND gate L1 may output the error-corrected packet start location information STP_mask to the masker 411 and the packet start location search circuit 420. For example, in this case, in the current clock cycle, when the packet start location information STP has a logic value of 1 at a certain location and the corresponding error data location information ERR is also a logic value of 1 (indicating invalid data), the error-removed packet starting location information STP_mask is a logic value of 0 at this location. Conversely, when the packet start location information STP is a logic value of 1 at another location and the corresponding error data location information ERR is a logic value of 0 (indicating no error in the data), the error-removed packet starting location information STP_mask is a logic value of 1 at this location. The first input terminal and the second input terminal of the masker 411 may respectively receive the error data location information ERR and the packet end location information EOP. The output terminal of the masker 411 may output the error-corrected packet end location information EOP mask. In some embodiments, the implementation of the masker 411 may be deduced with reference to the related description of the AND gate L1. In some embodiments, the masker 411 may also receive the error-corrected packet start location information STP_mask and a pending packet start information STP pending to update the error-corrected packet end location information EOP mask. In other embodiments, the error correction circuit 410 may also adopt other implementations, and the present embodiment is not limited in this regard.

The packet start location search circuit 420 and the packet end location search circuit 430 may be respectively coupled to the error correction circuit 410 to receive the error-corrected packet start location information STP_mask and the error-corrected packet end location information EOP mask. In particular, the packet start location search circuit 420 is configured to search for any valid packet start location in the error-corrected packet start location information STP_mask in the current clock cycle to generate a valid packet start location STP_location and a packet start location search result STP enable. The packet end location search circuit 430 is configured to search for any valid packet end location in the error-corrected packet end location information EOP mask in the current clock cycle to generate a valid packet end location EOP location and a packet end location search result EOP_enable. In particular, the packet start location search result STP enable and the packet end location search result EOP_enable may be transmitted to the round-robin circuit 440 to update a first packet start pointer STP_pointer_r and a first packet end pointer EOP_pointer_r according to the number of the valid packet start location STP_location and the number of the valid packet end location EOP location. The valid packet start location STP_location, the packet start location search result STP enable, the valid packet end location EOP location, the packet end location search result EOP_enable, the first packet start pointer STP_pointer_r, and the first packet end pointer EOP_pointer_r may be transmitted to the channel distribution circuit 450 to indicate the distribution mode of at least one packet data in the current clock cycle to the transaction layer processing channels CH0 to CH3.

In the present embodiment, the packet start location search circuit 420 may include packet start location search circuits 421, 422, 423, and 424 to divide the data size of the error-corrected packet start location information STP_mask into four channels for searching. For example, if the data size of the error-corrected packet start location information STP_mask is 16 bits, then the packet start location search circuits 421 to 424 may respectively search for any valid packet start location in bits 0 to 3, bits 4 to 7, bits 8 to 11, and bits 12 to 15 in the error-corrected packet start location information STP_mask to generate the valid packet start location STP_location and the packet start location search result STP enable. In particular, the number of the packet start location search circuits 421 to 424 and the data distribution method are just an example, and the present embodiment is not limited in this regard.

In the embodiment shown in FIG. 4, the packet end location search circuit 430 may include packet end location search circuits 431, 432, 433, and 434 to divide the data size of the error-corrected packet end location information EOP mask into four channels for searching. For example, if the data size of the error-corrected packet end location information EOP mask is 16 bits, then the packet end location search circuits 431 to 434 may be respectively configured to search for any valid packet end location in bits 0 to 3, bits 4 to 7, bits 8 to 11, and bits 12 to 15 in the error-corrected packet end location information EOP mask to generate the valid packet end location EOP location and the packet end location search result EOP_enable. In particular, the number of the packet end location search circuits 431 to 434 and the data distribution method are just an example, and the present embodiment is not limited in this regard.

The round-robin circuit 440 may be coupled to the packet start location search circuit 420 and the packet end location search circuit 430 to receive the packet start location search result STP enable and the packet end location search result EOP_enable. In the present embodiment, the round-robin circuit 440 may count the number of the valid packet start location in the current clock cycle according to the packet start location search result STP enable, and update the first packet start pointer STP_pointer_r according to the number of the valid packet start location. In the present embodiment, the round-robin circuit 440 may count the number of the valid packet end location in the current clock cycle according to the packet end location search result EOP_enable, and update the first packet end pointer EOP_pointer_r according to the number of the valid packet end location.

In the embodiment shown in FIG. 4, the round-robin circuit 440 may include an adder L2, an adder L3, a comparator L4, a comparator L5, a multiplexer L6, and a buffer 441. The adder L2 may be coupled to the packet start location search circuits 421 to 424 to count the number of the valid packet start location in the current clock cycle according to the packet start location search result STP enable to generate a second packet start pointer STP_pointer_ns. The adder L3 may be coupled to the packet end location search circuits 431 to 434 to count the number of the valid packet end location in the current clock cycle according to the packet end location search result EOP_enable to generate a second packet end pointer EOP_pointer_ns. In some embodiments, the output bits of the adder L2 and the adder L3 may be set to 2 bits, so that the value range of the second packet start pointer STP_pointer_ns and the second packet end pointer EOP_pointer_ns is limited to between 0 and 3. In some other embodiments, the output bits of the adder L2 and the adder L3 may be set to 3 bits, so that the most significant bit (HSB) may be used for determining overflow.

In the present embodiment, the buffer 441 may be coupled to the adder L2 and the adder L3. The buffer 441 may be configured to store the second packet start pointer STP_pointer_ns and the second packet end pointer EOP_pointer_ns, and output the first packet start pointer STP_pointer_r and the first packet end pointer EOP_pointer_r to indicate the transaction layer processing channel to which the current data distribution is pointing. In the present embodiment, the first packet start pointer STP_pointer_r may be fed back to the adder L2, and the first packet end pointer EOP_pointer_r may be fed back to the adder L3, to update the first packet start pointer STP_pointer_r and the first packet end pointer EOP_pointer_r by referring to the transaction layer processing channel pointed to last time during data distribution in each round. In the present embodiment, the comparator L4 may be coupled to the buffer 441. The comparator L4 may compare whether the first packet start pointer STP_pointer_r and the first packet end pointer EOP_pointer_r are the same, and output the pending packet start information STP pending to determine whether the at least one packet data in the current clock cycle is complete. For example, when the first packet start pointer STP_pointer_r is different from the first packet end pointer EOP_pointer_r, that is, the number of the valid packet start location in the current clock cycle is not equal to the number of the valid packet end location, there is incomplete packet data (unfinished TLP) in the current clock cycle. In this way, the transaction layer processing channel (one of the transaction layer processing channels CH0 to CH3) distributed to the last packet data in the current clock cycle needs to remain assigned to the next clock cycle, and may not be released until the next valid packet end location is received to indicate that the complete packet data is received. In the present embodiment, the pending packet start information STP pending may be fed back to the masker 411 in the error correction circuit 410, so that the masker 411 may update the error-corrected packet end location information EOP mask according to the error-corrected packet start location information STP_mask and the pending packet start information STP pending.

In the present embodiment, the comparator L5 and the multiplexer L6 may be coupled between the adder L2, the adder L3, and the buffer 441. The first input terminal and the second input terminal of the comparator L5 and the first input terminal and the second input terminal of the multiplexer L6 may respectively receive the second packet start pointer STP_pointer_ns and the second packet end pointer EOP_pointer_ns. The comparator L5 may compare whether the second packet start pointer STP_pointer_ns and the second packet end pointer EOP_pointer_ns are the same to determine whether the packet data in the current clock cycle is complete. For example, when the numbers are not the same, the comparator L5 may output a logic value of 1, indicating that there is incomplete data in the current clock cycle. The multiplexer L6 may select to output the second packet start pointer STP_pointer_ns or the second packet end pointer EOP_pointer_ns to the buffer 441 for storage according to the output of the comparator L5. For example, in the present embodiment, when the comparator L5 outputs a logic value of 0, the multiplexer L6 may output the second packet start pointer STP_pointer_ns. In the present embodiment, the buffer 441 may store the output of the comparator L5 and the multiplexer L6, and may output to the merge circuit 120, thereby notifying the merge circuit 120 that there is incomplete data in the current clock cycle, and the merge operation may only be performed after the complete data is received.

The channel distribution circuit 450 may be coupled to the round-robin circuit 440, the packet start location search circuit 420, and the packet end location search circuit 430. The channel distribution circuit 450 may transmit the packet start location search result STP enable and the valid packet start location STP_location to one corresponding transaction layer processing channel of the transaction layer processing channels CH0 to CH3 according to the first packet start pointer STP_pointer_r. The channel distribution circuit 450 may transmit the packet end location search result EOP_enable and the valid packet end location EOP location to one corresponding transaction layer processing channel of the transaction layer processing channels CH0 to CH3 according to the first packet end pointer EOP_pointer_r.

In the embodiment shown in FIG. 4, the channel distribution circuit 450 may include channel distribution circuits 451, 452, 453, 454, 455, 456, 457, and 458 to respectively perform data distribution on the valid packet start location STP_location and the valid packet end location EOP location in correspondence to each of the transaction layer processing channels CH0 to CH3. In particular, the corresponding method of the number of the channel distribution circuits 451 to 458 to the transaction layer processing channels CH0 to CH3 is just an example, and the present embodiment is not limited in this regard.

For example, the following Table 1 and Table 2 illustrate the output content of the channel distribution circuit 450 shown in FIG. 4 according to an embodiment of the invention. The vertical axis shown in Table 1 and Table 2 indicates time, that is, each row indicates one clock cycle. The horizontal axis shown in Table 1 indicates the output of the distribution circuits 451 to 454, wherein the distribution circuit 451 outputs a packet start location search result STP_E0 and a valid packet start location STP_L0 to the transaction layer processing channel CH0, the distribution circuit 452 outputs a packet start location search result STP_E1 and a valid packet start location STP_L1 to the transaction layer processing channel CH1, the distribution circuit 453 outputs a packet start location search result STP_E2 and a valid packet start location STP_L2 to the transaction layer processing channel CH2, and the distribution circuit 454 outputs a packet start location search result STP_E3 and a valid packet start location STP_L3 to the transaction layer processing channel CH3. The horizontal axis shown in Table 2 indicates the output of the distribution circuits 455 to 458, wherein the distribution circuit 455 outputs a packet end location search result EOP_E0 and a valid packet end location EOP_L0 to the transaction layer processing channel CH0, the distribution circuit 456 outputs a packet end location search result EOP_E1 and a valid packet end location EOP_L1 to the transaction layer processing channel CH1, the distribution circuit 457 outputs a packet end location search result EOP_E2 and a valid packet end location EOP_L2 to the transaction layer processing channel CH2, and the distribution circuit 458 outputs a packet end location search result EOP_E3 and a valid packet end location EOP_L3 to the transaction layer processing channel CH3. The valid packet start locations STP_L0 to STP_L3 fields of Table 1 and the valid packet end locations EOP_L0 to EOP_L3 fields of Table 2 indicate the locations in hexadecimal values.

TABLE 1

| \multicolumn{8}{c}{Output of distribution circuits 451 to 454} |
|---|---|---|---|---|---|---|---|
| STP_E0 | STP_L0 | STP_E1 | STP_L1 | STP_E2 | STP_L2 | STP_E3 | STP_L3 |
| 1 | 1 | 1 | 6 | 1 | C | 0 | 0 |
| 1 | 8 | 1 | D | 0 | 0 | 1 | 3 |
| 1 | F | 0 | 0 | 1 | 2 | 1 | A |
| 0 | 0 | 1 | 5 | 1 | C | 0 | 0 |

TABLE 2

| \multicolumn{8}{c}{Output of distribution circuits 455 to 458} |
|---|---|---|---|---|---|---|---|
| EOP_E0 | EOP_L0 | EOP_E1 | EOP_L1 | EOP_E2 | EOP_L2 | EOP_E3 | EOP_L3 |
| 1 | 3 | 1 | 9 | 0 | 0 | 0 | 0 |
| 1 | A | 1 | F | 1 | 0 | 1 | 5 |
| 0 | 0 | 0 | 0 | 1 | 7 | 1 | C |
| 1 | 2 | 1 | 9 | 1 | E | 0 | 0 |

Please refer to FIG. 3B, FIG. 3C, FIG. 4, Table 1, and Table 2. In this case, in the embodiment shown in FIG. 3B, the packet start location information STP and the packet end location information EOP respectively indicate the error-corrected packet start location information STP_mask and the error-corrected packet end location information EOP mask of at least one packet data in the current clock cycle, and also the round-robin method shown in FIG. 3C is adopted.

In the first clock cycle shown in FIG. 3B, the (error-corrected) packet start location information STP[15:0] is "0001 0000 0100 0010" and the (error-corrected) packet end location information EOP[15:0] is "0000 0010 0000 1000". The packet start location search circuits 421 to 424 search the (error-corrected) packet start location information STP [15:0] to learn that the valid packet starts in the first clock cycle shown in FIG. 3B are respectively located on the three locations of the (error-corrected) packet start location informations STP[1], STP[6], and STP[12], and therefore the valid packet start location STP_location output by the packet start location search circuits 421 to 424 includes "1, 6, C" (indicated in hexadecimals). According to the current first packet start pointer STP_pointer_r (pointing to the transaction layer processing channel CH0), the channel distribution circuit 450 distributes the valid packet start locations "1, 6, C" to the transaction layer processing channels CH0 to CH2. That is, the packet start locations "1, 6, C" in the current clock cycle are used as the valid packet start locations STP_L0 to STP_L2 (as shown in Table 1). The packet end location search circuits 431 to 434 search the (error-corrected) packet end location information EOP[15:0] to learn that the valid packet ends in the first clock cycle shown in FIG. 3B are respectively located on the two locations of the (error-corrected) packet end location informations EOP[3] and EOP[9], and therefore the valid packet end location EOP location output by the packet end location search circuits 431 to 434 includes "3, 9". According to the current first packet end pointer EOP_pointer_r (pointing to the transaction layer processing channel CH0), the channel distribution circuit 450 distributes the valid packet end locations "3, 9" to the transaction layer processing channels CH0 to CH1. That is, the packet end locations "3, 9" in the current clock cycle are used as the valid packet end locations EOP_L0 to EOP_L1 (as shown in Table 2). Based on the valid packet start locations STP_L0 to STP_L3 and the valid packet end locations EOP_L0 to EOP_L3, the transaction layer processing channels CH0 to CH2 may retrieve the data of the corresponding locations from the data bus DL in the current clock cycle. In addition, the round-robin circuit 440 may count the packet start location search result STP enable and the packet end location search result EOP_enable in the current clock cycle to update the first packet start pointer STP_pointer_r (updated from pointing to the transaction layer processing channel CH0 to pointing to the transaction layer processing channel CH3), and update the first packet end pointer EOP_pointer_r (updated from pointing to the transaction layer processing channel CH0 to pointing to the transaction layer processing channel CH2).

By analogy, the other clock cycles shown in FIG. 3B may be deduced by referring to the related description of the first clock cycle shown in FIG. 3B, and are therefore not repeated herein. The running results of the other clock cycles are shown in FIG. 3B, FIG. 3C, Table 1, and Table 2.

Figure 5A:
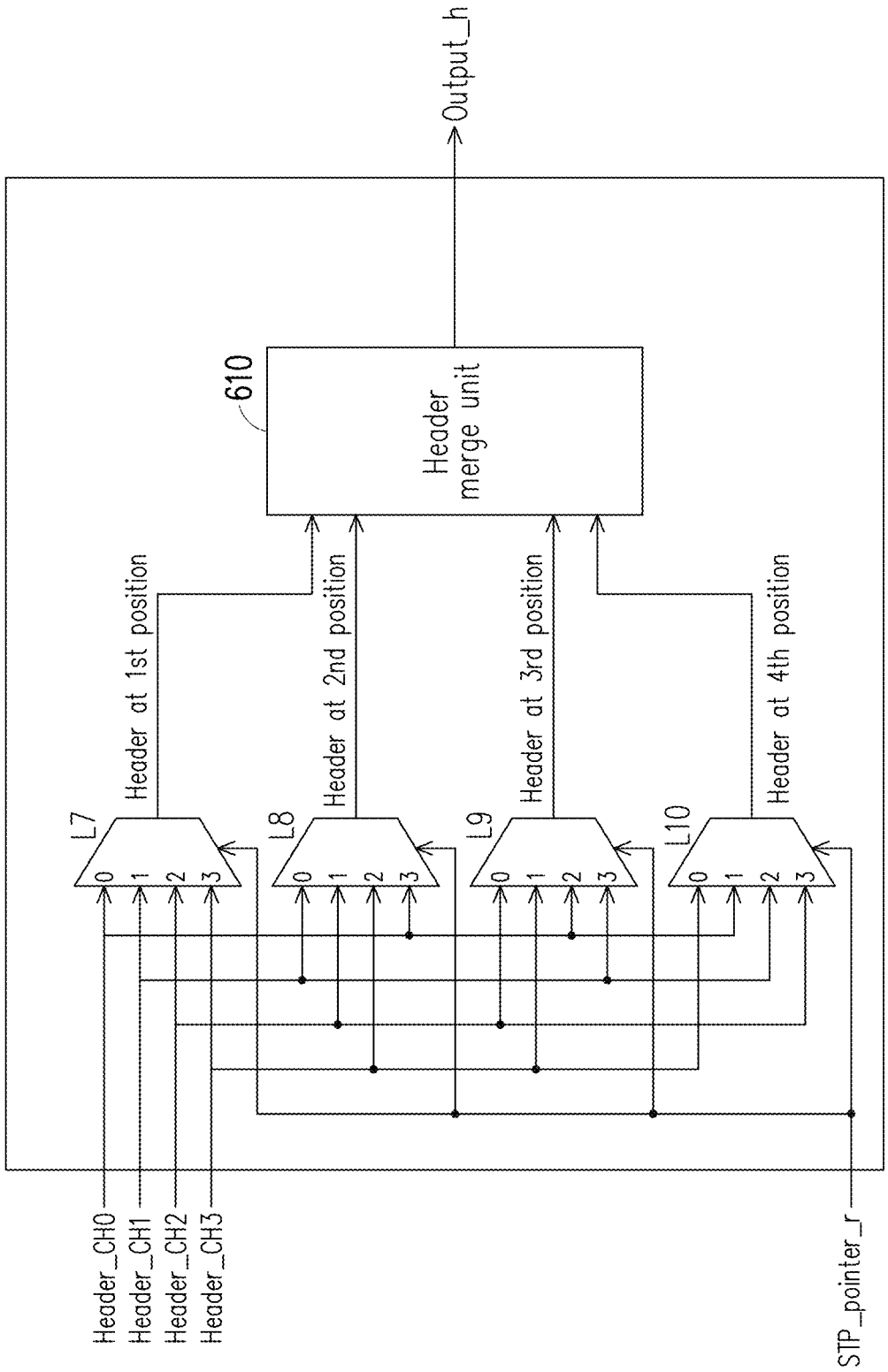
FIG. 5A is a schematic circuit block diagram illustrating the header merge circuit shown in FIG. 1 according to an embodiment of the invention.
Figure 5B:
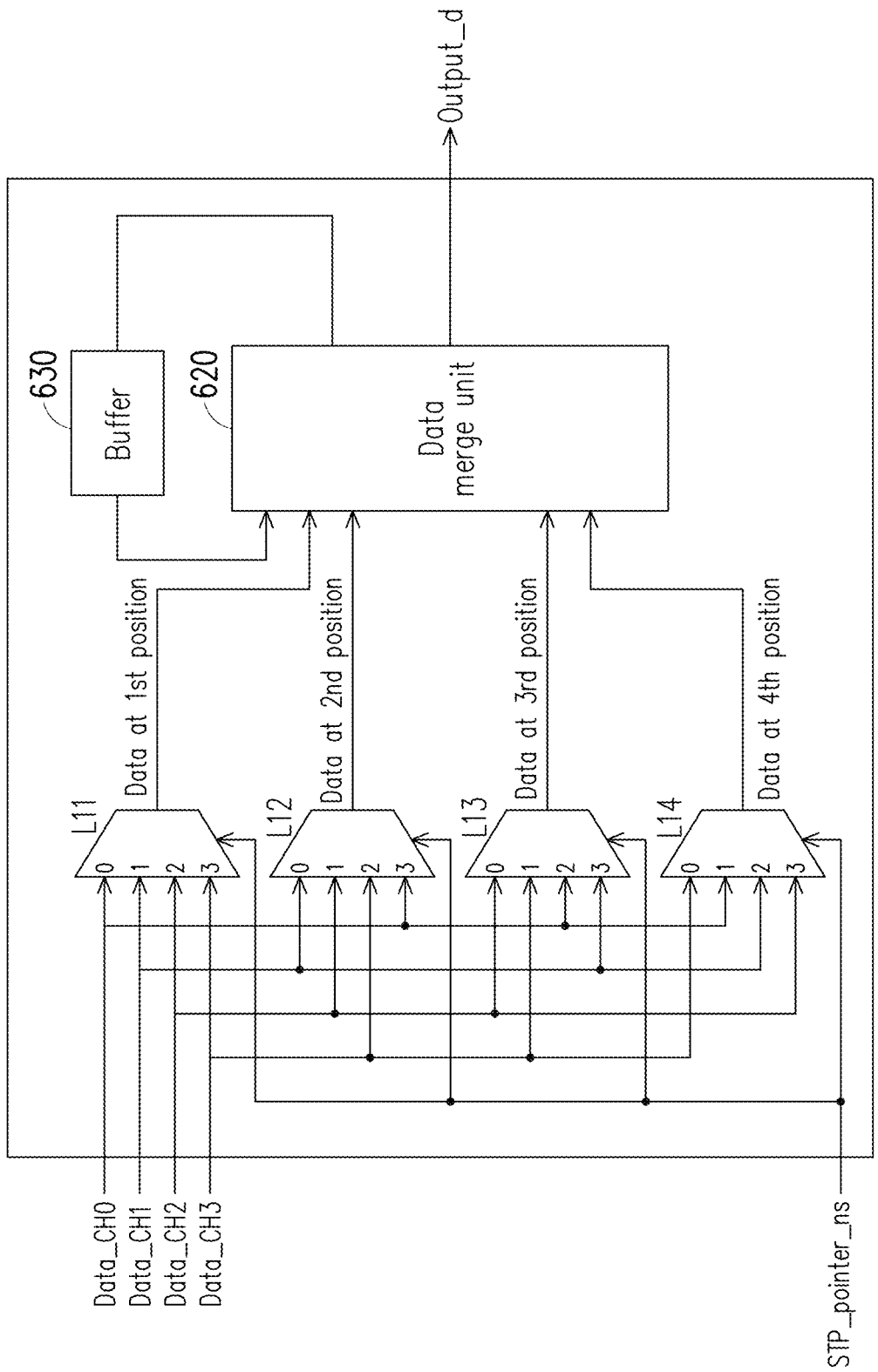
FIG. 5B is a schematic circuit block diagram illustrating the data merge circuit shown in FIG. 1 according to an embodiment of the invention.

FIG. 5A is a circuit block diagram illustrating the header merge circuit 121 shown in FIG. 1 according to an embodiment of the invention. FIG. 5B is a circuit block diagram illustrating the data merge circuit 122 shown in FIG. 1 according to an embodiment of the invention. Please refer to FIG. 1, FIG. 5A, and FIG. 5B. In some embodiments, the channel selection circuit 110 shown in FIG. 1 may output the second packet start pointer STP_pointer_ns and the first packet start pointer STP_pointer_r, and the transaction layer processing channels CH0 to CH3 may output transaction layer processing results. In particular, the transaction layer processing results may be divided into headers Header_CH0 to Header_CH3 and data Data_CH0 to Data_CH3. The header merge circuit 121 may receive the first packet start pointer STP_pointer_r and the headers Header_CH0 to Header_CH3, and the data merge circuit 122 may respectively receive the second packet start pointer STP_pointer_ns and the data Data_CH0 to Data_CH3 to perform selective merge processing, and respectively output a header processing result Out h and a data processing result Out d as the transaction layer processing results. In some embodiments, the second packet start pointer STP_pointer_ns and the first packet start pointer STP_pointer_r may be different in timing. For example, the first packet start pointer STP_pointer_r may be delayed by one work cycle for the second packet start pointer STP_pointer_ns, so as to meet the timing requirements when the header merge circuit 121 and the data merge circuit 122 perform merge processing independently.

In the embodiment shown in FIG. 5A, the header merge circuit 121 includes multiplexers L7, L8, L9, and L10 and a header merge unit 610 coupled to each other. The header merge unit 610 may receive the headers Header_CH0 to Header_CH3 sent by the transaction layer processing channels CH0 to CH3 via the multiplexers L7 to L10, respectively, to perform merging by maintaining the header arrangement of at least one packet data in the current clock cycle. In the embodiment shown in FIG. 5B, the data merge circuit 122 includes multiplexers L11, L12, L13, and L14 and a data merge unit 620 coupled to each other, and a buffer 630 is coupled to the data merge unit 620. The data merge unit 620 may receive the data Data_CH0 to Data_CH3 sent by the transaction layer processing channels CH0 to CH3 via the multiplexers L11 to L14, to perform merging by maintaining the data arrangement of at least one packet data in the current clock cycle. In the present embodiment, the buffer 630 may be configured to store the incomplete data in the current clock cycle to be retained until the next clock cycle, and perform data merging via the data merge unit 620 after confirming that the complete data is received.

Based on the above, the transaction layer circuit 100 of the PCIe of the embodiments of the invention may distribute each of the one or plurality of packet data in the current clock cycle to one of the plurality of transaction layer processing channels CH0 to CH3 for transaction layer processing in a round-robin manner via the channel selection circuit 110, and selectively merge the transaction layer processing results output by the plurality of transaction layer processing channels CH0 to CH3 via the merge circuit 120. Therefore, the transaction layer circuit may simultaneously process a plurality of transaction layer packets (TLPs) in the same clock cycle.

Lastly, it should be noted that the above embodiments are only used to describe the technical solution of the invention instead of limiting it. Although the invention has been described in detail with reference to each embodiment above, those having ordinary skill in the art should understand that the technical solution recited in each embodiment above may still be modified, or some or all of the technical features thereof may be equivalently replaced. These modifications or replacements do not make the essence of the corresponding technical solutions depart from the scope of the technical solution of each embodiment of the invention.

What is claimed is:

1. A transaction layer circuit of a PCIe, wherein the transaction layer circuit comprises:
    a plurality of transaction layer processing channels coupled to a data bus, wherein the data bus is configured to transmit at least one packet data output by a data link layer circuit of the PCIe;
    a channel selection circuit configured to receive a packet start location information and a packet end location information in a current clock cycle from the data link layer circuit and distribute the at least one packet data in the current clock cycle to at least one of the plurality of transaction layer processing channels according to the packet start location information and the packet end location information, wherein the channel selection circuit distributes a header and a data belonging to a same transaction layer packet to a same transaction layer processing channel of the plurality of transaction layer processing channels; and
    a merge circuit coupled to the plurality of transaction layer processing channels, wherein the merge circuit selectively merges transaction layer processing results output by the plurality of transaction layer processing channels based on the distribution of the at least one packet data in the current clock cycle to the plurality of transaction layer processing channels via the channel selection circuit.

2. A transaction layer circuit of a PCIe wherein the transaction layer circuit comprises:
    a plurality of transaction layer processing channels coupled to a data bus, wherein the data bus is configured to transmit at least one packet data output by a data link layer circuit of the PCIe;
    a channel selection circuit configured to receive a packet start location information and a packet end location information in a current clock cycle from the data link layer circuit and distribute the at least one packet data in the current clock cycle to at least one of the plurality of transaction layer processing channels according to the packet start location information and the packet end location information; and
    a merge circuit coupled to the plurality of transaction layer processing channels, wherein the merge circuit selectively merges transaction layer processing results output by the plurality of transaction layer processing channels based on the distribution of the at least one packet data in the current clock cycle to the plurality of transaction layer processing channels via the channel selection circuit,
    wherein the channel selection circuit counts a number of a valid packet start location indicated by the packet start location information and a number of a valid packet end location indicated by the packet end location information in the current clock cycle, the channel selection circuit distributes the at least one packet data in the current clock cycle to at least one of the plurality of transaction layer processing channels according to a packet start pointer and a packet end pointer, the channel selection circuit updates the packet start pointer according to the number of the valid packet start location, and the channel selection circuit updates the packet end pointer according to the number of the valid packet end location.

3. A transaction layer circuit of a PCIe wherein the transaction layer circuit comprises:
    a plurality of transaction layer processing channels coupled to a data bus, wherein the data bus is configured to transmit at least one packet data output by a data link layer circuit of the PCIe;
    a channel selection circuit configured to receive a packet start location information and a packet end location information in a current clock cycle from the data link layer circuit and distribute the at least one packet data in the current clock cycle to at least one of the plurality of transaction layer processing channels according to the packet start location information and the packet end location information; and
    a merge circuit coupled to the plurality of transaction layer processing channels, wherein the merge circuit selectively merges transaction layer processing results output by the plurality of transaction layer processing channels based on the distribution of the at least one packet data in the current clock cycle to the plurality of transaction layer processing channels via the channel selection circuit, wherein the channel selection circuit comprises:
an error correction circuit configured to receive an error data location information, the packet start location information, and the packet end location information in the current clock cycle from the data link layer circuit, mask an invalid packet start location in the packet start location information according to the error data location information to generate an error-corrected packet start location information, and mask an invalid packet end location in the packet end location information according to the error data location information to generate an error-corrected packet end location information;
a packet start location search circuit coupled to the error correction circuit to receive the error-corrected packet start location information, and configured to search for any valid packet start location in the error-corrected packet start location information in the current clock cycle to generate a packet start location search result;
a packet end location search circuit coupled to the error correction circuit to receive the error-corrected packet end location information, and configured to search for any valid packet end location in the error-corrected packet end location information in the current clock cycle to generate a packet end location search result;
a round-robin circuit coupled to the packet start location search circuit and the packet end location search circuit, wherein the round-robin circuit counts a number of the valid packet start location in the current clock cycle according to the packet start location search result, the round-robin circuit updates the packet start pointer according to the number of the valid packet start location, the round-robin circuit counts a number of the valid packet end location in the current clock cycle according to the packet end location search result, and the round-robin circuit updates the packet end pointer according to the number of the valid packet end location; and
a channel distribution circuit coupled to the round-robin circuit, the packet start location search circuit, and the packet end location search circuit, wherein the channel distribution circuit transmits any valid packet start location in the packet start location search result to one corresponding transaction layer processing channel in the plurality of transaction layer processing channels according to the packet start pointer, and the channel distribution circuit transmits any valid packet end location in the packet end location search result to one corresponding transaction layer processing channel in the plurality of transaction layer processing channels according to the packet end pointer.

4. A transaction layer circuit of a PCIe wherein the transaction layer circuit comprises:
a plurality of transaction layer processing channels coupled to a data bus, wherein the data bus is configured to transmit at least one packet data output by a data link layer circuit of the PCIe;
a channel selection circuit configured to receive a packet start location information and a packet end location information in a current clock cycle from the data link layer circuit and distribute the at least one packet data in the current clock cycle to at least one of the plurality of transaction layer processing channels according to the packet start location information and the packet end location information; and
a merge circuit coupled to the plurality of transaction layer processing channels, wherein the merge circuit selectively merges transaction layer processing results output by the plurality of transaction layer processing channels based on the distribution of the at least one packet data in the current clock cycle to the plurality of transaction layer processing channels via the channel selection circuit,
wherein the channel selection circuit distributes the at least one packet data in the current clock cycle to at least one of the plurality of transaction layer processing channels in a round-robin manner or a fixed priority manner according to the packet start location information and the packet end location information.

5. The transaction layer circuit of claim 1, wherein the merge circuit stores the transaction layer processing results in a receive buffer.

6. An operation method of a transaction layer circuit of a PCIe, wherein the transaction layer circuit comprises a channel selection circuit, a merge circuit, and a plurality of transaction layer processing channels, and the operation method comprises:
coupling the plurality of transaction layer processing channels to a data bus, wherein the data bus is configured to transmit at least one packet data output by a data link layer circuit of the PCIe;
receiving a packet start location information and a packet end location information in a current clock cycle from the data link layer circuit via the channel selection circuit;
distributing the at least one packet data in the current clock cycle to at least one of the plurality of transaction layer processing channels via the channel selection circuit according to the packet start location information and the packet end location information, wherein a header and a data belonging to a same transaction layer packet are distributed to a same transaction layer processing channel of the plurality of transaction layer processing channels; and
merging transaction layer processing results output by the plurality of transaction layer processing channels selectively via the merge circuit based on the distribution of the at least one packet data in the current clock cycle to the plurality of transaction layer processing channels via the channel selection circuit.

7. The operation method of claim 6, wherein the operation method further comprises:
counting a number of a valid packet start location indicated by the packet start location information and a number of a valid packet end location indicated by the packet end location information in the current clock cycle via the channel selection circuit;
distributing the at least one packet data in the current clock cycle to at least one of the plurality of transaction layer processing channels according to a packet start pointer and a packet end pointer via the channel selection circuit;
updating the packet start pointer according to the number of the valid packet start location via the channel selection circuit; and
updating the packet end pointer according to the number of the valid packet end location via the channel selection circuit.

8. The operation method of claim 6, wherein the operation method further comprises:

distributing the at least one packet data in the current clock cycle to at least one of the plurality of transaction layer processing channels in a round-robin manner or a fixed priority manner via the channel selection circuit.

9. The operation method of claim 6, wherein the operation method further comprises:

storing the transaction layer processing results in a receive buffer via the merge circuit.

\* \* \* \* \*